United States Patent [19]
Wierman et al.

[11] Patent Number: 5,183,149
[45] Date of Patent: Feb. 2, 1993

[54] BELT CONVEYOR SYSTEM

[75] Inventors: Michael J. Wierman, Helsingborg; Lennart F. Olsson, Nyhamnsläge, both of Sweden

[73] Assignee: Frigoscandia Food Process Systems AB, Helsingborg, Sweden

[21] Appl. No.: 757,793

[22] Filed: Sep. 11, 1991

[51] Int. Cl.$^5$ .................................................. B65G 13/02
[52] U.S. Cl. ...................................... 198/778; 198/792
[58] Field of Search .............. 198/778, 792, 831, 851, 198/852, 853; 62/381

[56] References Cited

U.S. PATENT DOCUMENTS

| | | | |
|---|---|---|---|
| 3,938,651 | 2/1976 | Alfred et al. | 198/778 |
| 4,036,352 | 7/1977 | White | 198/778 |
| 4,078,655 | 3/1978 | Roinestad | 198/778 X |
| 4,603,776 | 8/1986 | Olsson | 198/778 |
| 4,662,509 | 5/1987 | Kaak | 198/792 |
| 4,867,301 | 9/1989 | Roinstad et al. | 198/778 X |
| 4,878,362 | 11/1989 | Tyree, Jr. | 198/852 X |
| 4,899,871 | 2/1990 | Olsson | 198/778 |
| 4,951,807 | 8/1990 | Roinstad et al. | 198/778 |

Primary Examiner—D. Glenn Dayoan
Assistant Examiner—Cheryl L. Gastineau
Attorney, Agent, or Firm—Browdy and Neimark

[57] ABSTRACT

An endless conveyor belt of a belt conveyor system in a plant for air treatment of food products follows a helical path section preceded by a straight path section and followed by another straight path section. In the preceding straight path section, the conveyor belt remains collapsed and in the following straight path section, the conveyor belt remains expanded. At the transition between the preceding straight path section and the helical path section, the conveyor belt is expanded along the outer lateral edge of the belt. At the transition between the helical path section and the following straight path section, the conveyor belt is expanded along the inner lateral edge of the belt.

9 Claims, 7 Drawing Sheets

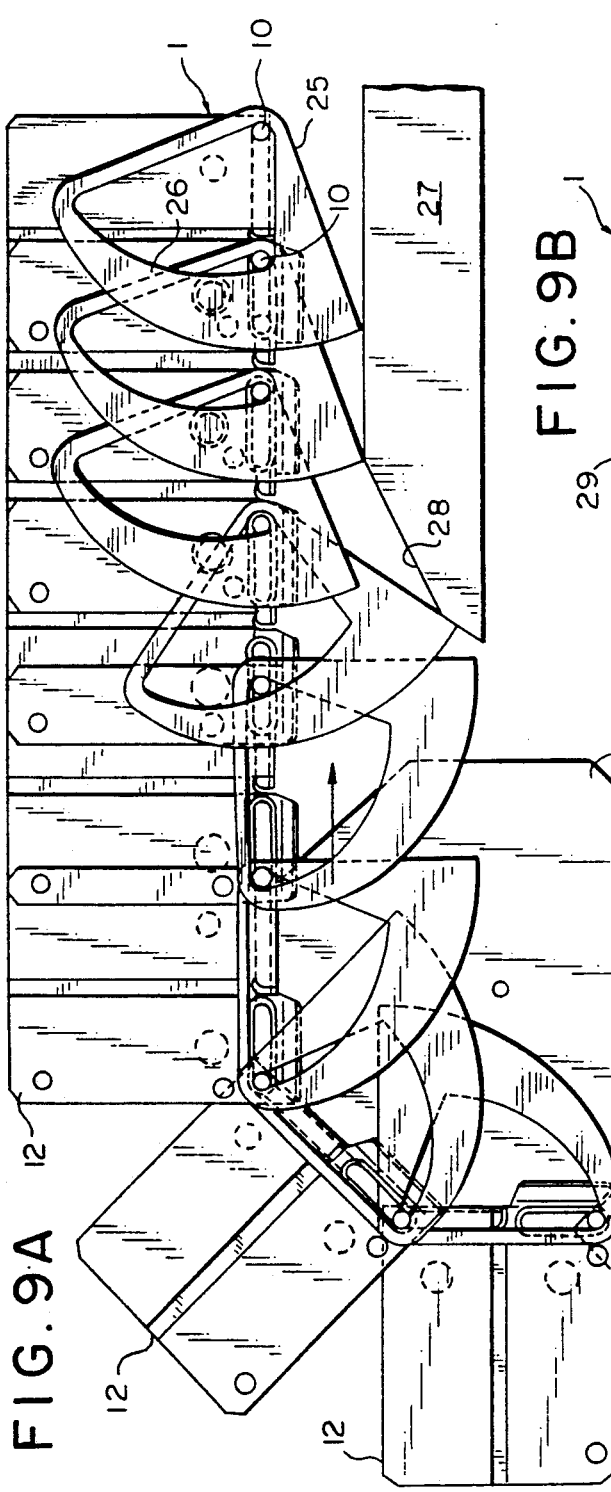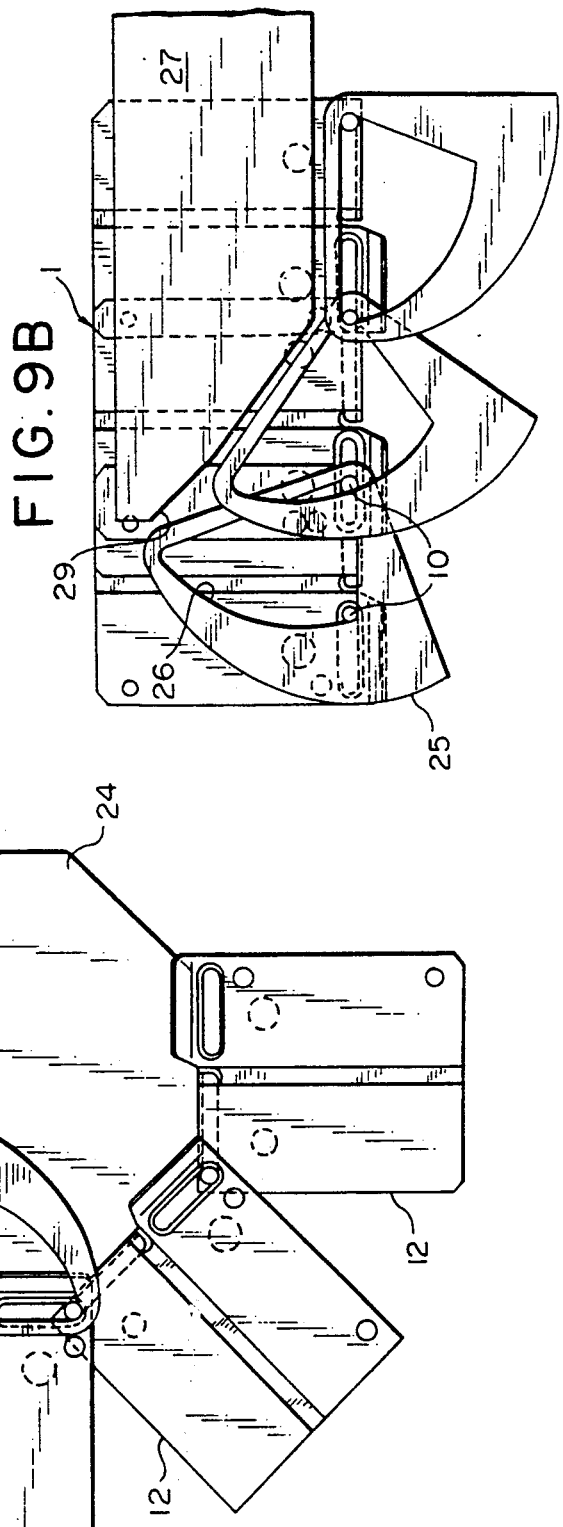

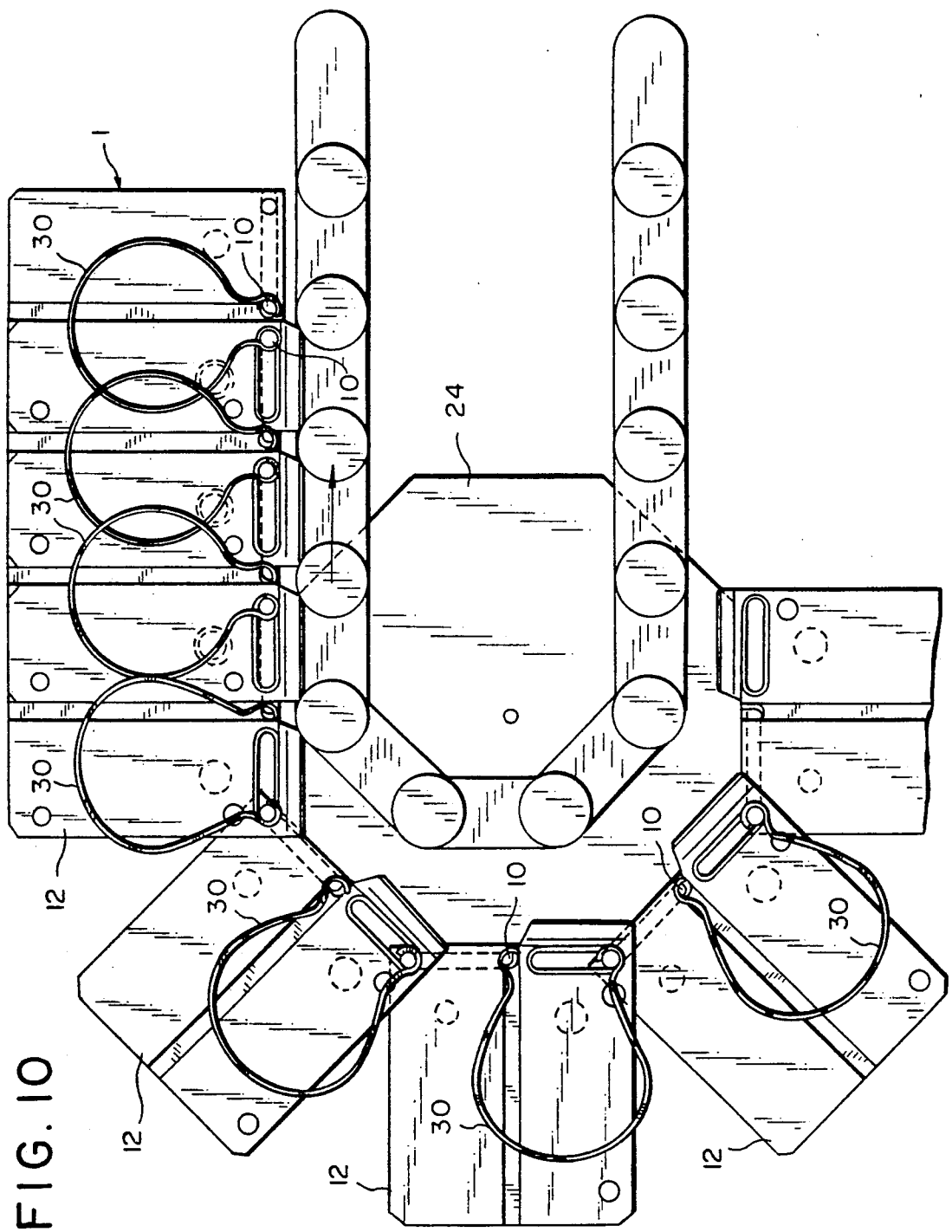

BELT CONVEYOR SYSTEM

BACKGROUND OF THE INVENTION

1. Field of the Invention

The present invention pertains to a belt conveyor system in a plant for treatment of food products.

2. Description of the Prior Art

Plants for treatment of food products using hot or cold air, including steam, in order to cook, heat, dry, moisture, chill, refrigerate or freeze the food products are known. In an advantageous arrangement, such plants include a belt conveyor system comprising an endless conveyor belt following, through part of its length, a helical path section and a preceding straight path section. Also, the helical path section is often followed by another straight path section, the two straight path sections being interconnected by a return path section.

An endless conveyor belt can comprise transverse elements, e.g. rods, interconnected by links disposed along opposite lateral edges of the belt. The successive links at each side of the belt may be mutually slideable in the longitudinal direction of the belt such that the belt is permitted to follow lateral curves in both directions.

Other endless belts for use in an air treatment plant including a helical path section have links at one lateral edge of the belt which are not mutually slideable but define a constant pitch, e.g. as disclosed in U.S. Pat. Nos. 4,867,301 to Roinestad and 4,878,362 to Tyree.

Conveyor belts having a sliding action between the links at both lateral edges of the belt experience collapsing or contraction of the links along the inside lateral edge of the belt in the helical path section. More precisely, when the belt reaches a point of transition between the helical path section and the preceding straight path section, the links at the inner lateral edge of the belt slide towards each other so as to present a reduced pitch, while the links at the outer lateral edge of the belt either retain the same pitch or expand by sliding away from each other to a greater pitch than along the preceding straight path section.

The collapsing or contraction of a conveyor belt used for food products is disadvantageous in that delicate food products, such as meat patties and fish filets, loaded on the belt upstream of the point of transition, may adhere to or be damaged by the collapsing belt or even come into contact with each other. As a result, the appearance of the food products may be deteriorated or they may be difficult to unload from the belt.

Using conveyor belts of the type having links at the inner lateral edge which retain a constant pitch eliminates collapsing of the belt at said point of transition between a straight path section and a helical path section. However, at a point of transition between the helical path section and a following straight path section there is a contracting action between the links. Therefore, if the food products treated by air in the helical path section are still delicate, they can be damaged at said point of transition. Further, traction means engaging the conveyor belt on the downstream side of the helical path section act only on that lateral edge of the belt where the links define a constant pitch. Finally, in a freezing plant freezing together of the belt links may render it difficult to contact said links at the downstream side of the belt pile.

SUMMARY OF THE INVENTION

It is an object of the present invention to provide a belt conveyor system for use in a plant for treatment of food products, which has an endless conveyor belt that follows, through part of its length, a helical path section preceded by a straight path section, but that does not undergo any contraction at a point of transition between said two path sections.

Another object of the present invention is to provide such a belt conveyor system in which the conveyor belt neither undergoes any contraction at a point of transition between said helical path section and a following straight path section.

Still another object of the present invention is to provide a belt conveyor system having a conveyor belt which on the downstream side of a helical part section can take up tractive forces along both lateral edges of the belt.

These and other objects of the present invention are provided in a plant for treatment of food products by means of a belt conveyor system which comprises an endless conveyor belt following, through part of its length, a helical path section preceded by a straight path section. The belt includes transverse elements interconnected by links disposed along opposite lateral edges of the belt. The successive links at each lateral edge of the belt are mutually slideable in the longitudinal direction of the belt and also are mutually pivotable about a transverse axis substantially in the plane of the belt. Thus, the belt is permitted to follow lateral curves in both directions and to pass around a roller having an axis parallel to said transverse axis. Further, by providing means for collapsing the belt along a predetermined part of said straight path section closest to said helical path section, the links at a point of transition from said straight path section to said helical path section are expanded along the outer lateral edge of the belt and are held collapsed along the inner lateral edge of the belt.

In a preferred embodiment of the present invention, the helical path section is followed by another straight path section. Here, traction means are provided for applying force on the links at both lateral edges of the belt in said other straight path section, whereby the links at the point of transition from said helical path section to said other straight path section, i.e. on the downstream side of the helical path section, are expanded along the inner lateral edge of the belt and are held expanded along the outer lateral edge of the belt.

The collapsing means on the upstream side of the helical path section may take various forms.

In a first embodiment, the collapsing means may comprise a drive roller engaging the links at the upstream side of said predetermined part of said straight path section.

In a second embodiment, the collapsing means may comprise chains engaging the links at both lateral edges of the belt such that the belt is collapsed along said predetermined part of said straight path section.

In a third embodiment, the collapsing means may comprise cam controlled levers pivotably attached to each link and a cam surface along said predetermined part of said straight path section upstream of the helical path section.

In a fourth embodiment, the successive links at each lateral edge of the conveyor belt may have interconnecting springs tending to reduce the pitch of said links.

Although the present invention primarily is intended for a belt conveyor system of the type having a self-supported conveyor belt, e.g. as disclosed in U.S. Pat. No. 4,603,776, incorporated herein by reference, it may also be applied to a conveyor belt supported by separate rails at one or both lateral edges.

BRIEF DESCRIPTION OF THE DRAWINGS

FIGS. 9A and 9B are elevational views of a third embodiment of the collapsing means according to the present invention.

FIG. 10 is an elevational view of a fourth embodiment of a collapsing means according to the present invention.

DETAILED DESCRIPTION OF THE PREFERRED EMBODIMENTS

Figure 1:
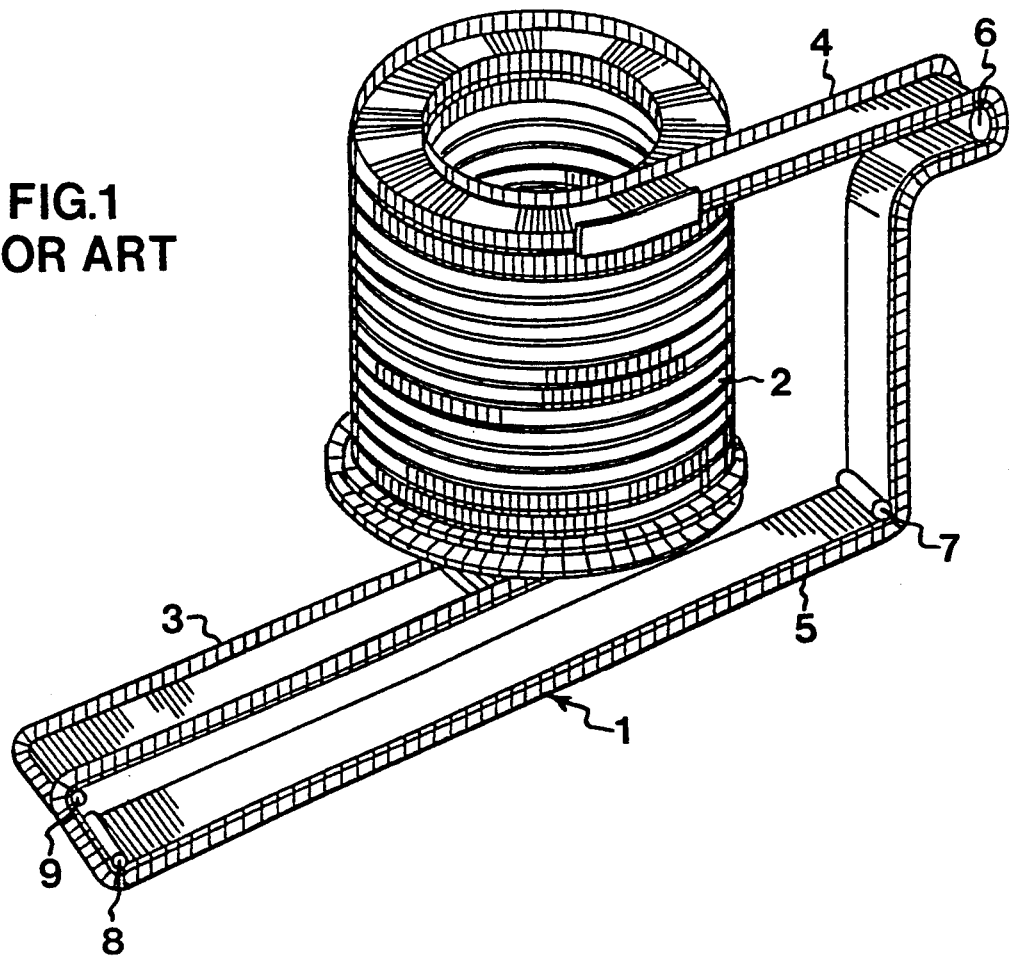
FIG. 1 is a perspective view of the conveyor belt of a belt conveyor system according to the prior art.

Referring now to FIGS. 1 to 4 of the drawings, a prior art belt conveyor system will first be described. The belt conveyor system illustrated in FIG. 1 comprises a conveyor belt 1 which is arranged to follow, along a part of its length, a helical path section 2 comprising a number of tiers extending helically above one another in a pile. The conveyor belt 1 is endless and travels along a first straight path section 3 to the start of the helical path section 2 at the bottom end of the pile where there is a point of transition between these two sections. The first straight path section 3 preceding the helical path section 2 forms an infeed portion of the belt conveyor system, and a loading station (not shown) for loading food products on the conveyor belt is placed at any point along said first straight path section 3.

In the helical path section 2, the tiers in the pile rotate together as a solid drum because the conveyor belt is self-supporting at both lateral edges of the belt, as will be described more in detail.

The conveyor belt having travelled through the pile emerges from the end of the helical path section 2 at the top end of the pile where there is a point of transition between the helical path section 2 and a following second straight path section 4. This second straight path section 4 forms an outfeed portion of the belt conveyor system, and an unloading station (not shown) is normally placed at a downstream end of the second straight path section 4.

The second straight path section 4 is connected to the first straight path section 3 by a return path section 5 where the conveyor belt 1 travels over a plurality of rollers 6 to 9. The roller 6 may be a drive roller applying a tractive force on the belt 1 and thus comprising a traction means.

To be able to travel through the different sections of the belt conveyor system illustrated, the conveyor belt must be permitted to follow lateral curves and to pass around rollers such as the rollers 6 to 9.

Therefore, the conveyor belt 1 comprises a plurality of transverse elements, preferably rods 10, interconnected by links 11, 12 disposed along opposite lateral edges of the belt 1. Each link 11, 12 is fixedly connected to two rods 10 and has a long hole 13 for receiving a rod 10 of an adjoining link 11, 12. As a consequence, the successive links 11 and 12, respectively, at each lateral edge of the belt 1 are mutually slideable in the longitudinal direction of the belt 1 and mutually pivotable about a transverse axis substantially in the plane of the belt.

Further, the links 11, 12 are designed as upstanding spacing members which are adapted with their upper end portions to bear against the lower end portions of the spacing members of the overlying tier of the conveyor belt 1 in the helical path section 2 in order to permit the overlying tier to be supported by the underlying tier.

Each link 11, 12 consists of two parts 14, 15 and 16, 17, respectively, which are slightly offset laterally relative to each other. The parts 14, 16 each have a downwardly extending flange 18 and 19, respectively, which is inclined inwards. These flanges 18, 19 constitute shoulders with which one side of the upper end portions of the links 11, 12 is adapted to engage to prevent lateral displacements of the belt tiers. Other engagement means (not shown) may be provided on the links 11, 12 in order to form shoulders engaging the other side of the upper end portions of the links 11, 12, thereby completely preventing lateral displacements of the belt tiers.

The pile of superimposed helically extending tiers of the endless conveyor belt 1 is supported by a supporting installation (not shown), e.g. comprising two endless chains arranged underneath the lowermost tier of the belt pile and supporting the two lateral edge portions of the belt 1. Details of such an installation are disclosed in U.S. Pat. No. 4,899,871 to Olsson and assigned to the present assignee.

The belt conveyor system according to the present invention may use such a conveyor belt as described above, but it may also use other endless conveyor belts that are permitted to follow lateral curves in both directions and to pass around a roller having an axis parallell to a transverse axis in the plane of the belt. Thus, the conveyor belt used need not be self-supporting or could be self-supporting at one lateral edge only.

Figure 4:
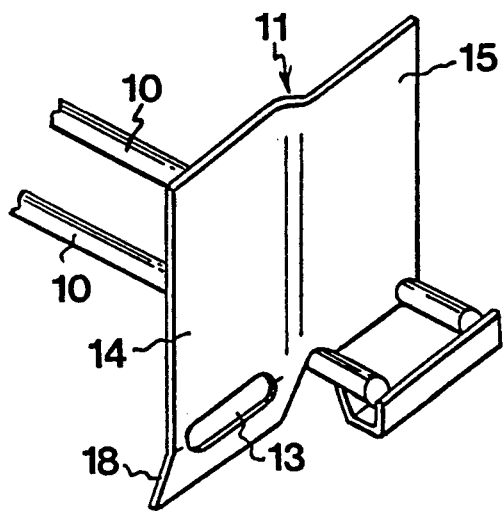
FIG. 4 is a perspective view of a link at one transverse edge of the belt in FIGS. 2 and 3.
Figure 2:
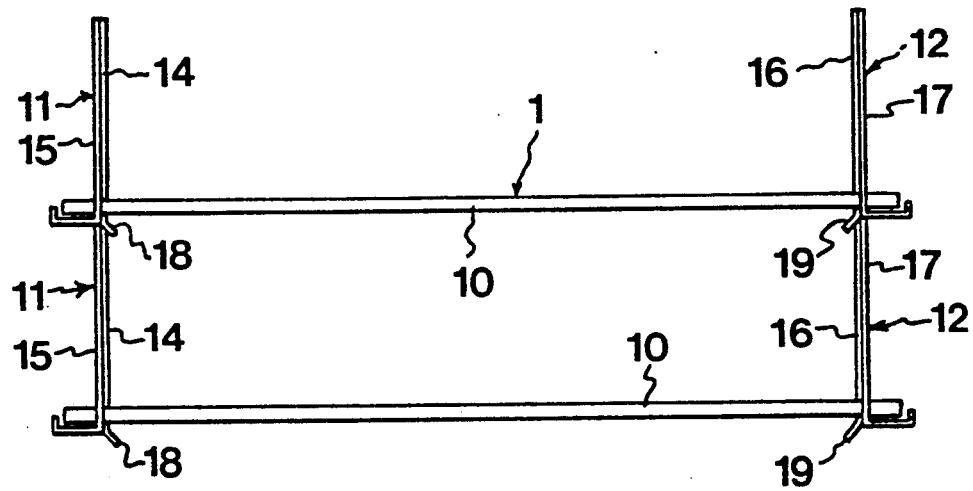
FIG. 2 shows a cross-section of two prior art conveyor belt parts piled upon one another.
Figure 3:
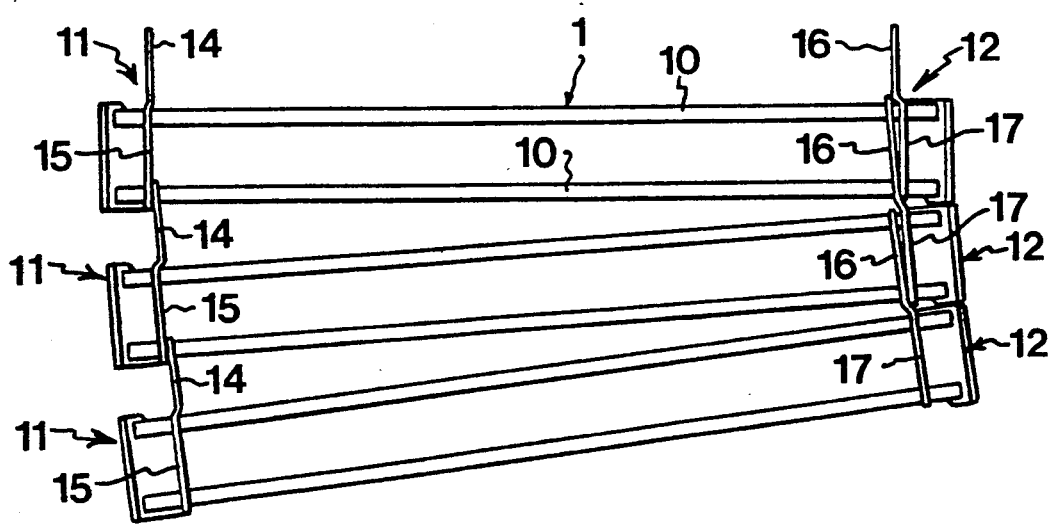
FIG. 3 is a top plan view of part of the conveyor belt shown in FIG. 2.
Figure 5:
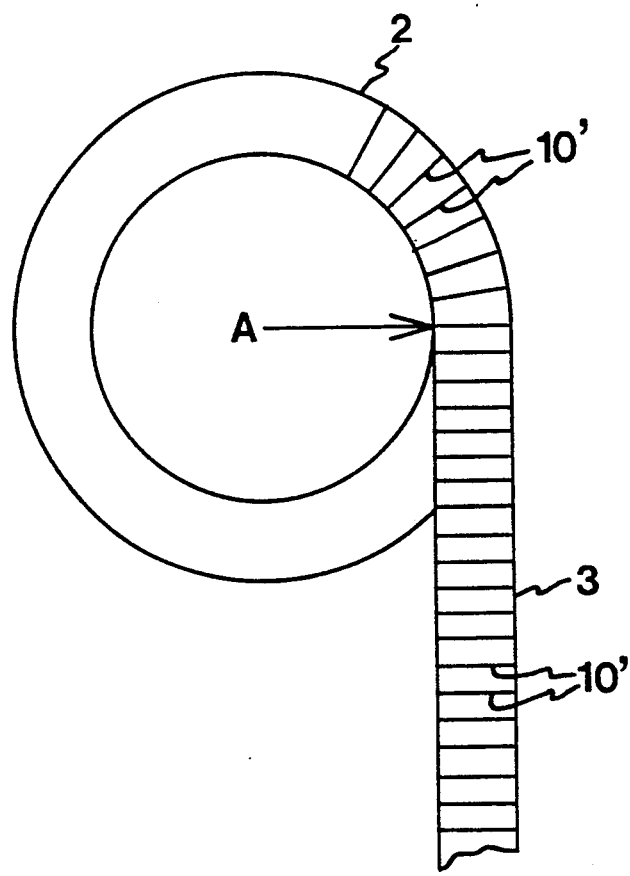
FIGS. 5 and 6 are schematic top plan views of a conveyor belt as shown in FIGS. 2 to 4 and illustrate the inventive changes of pitch at the start and at the end, respectively, of a helical path section.
Figure 6:
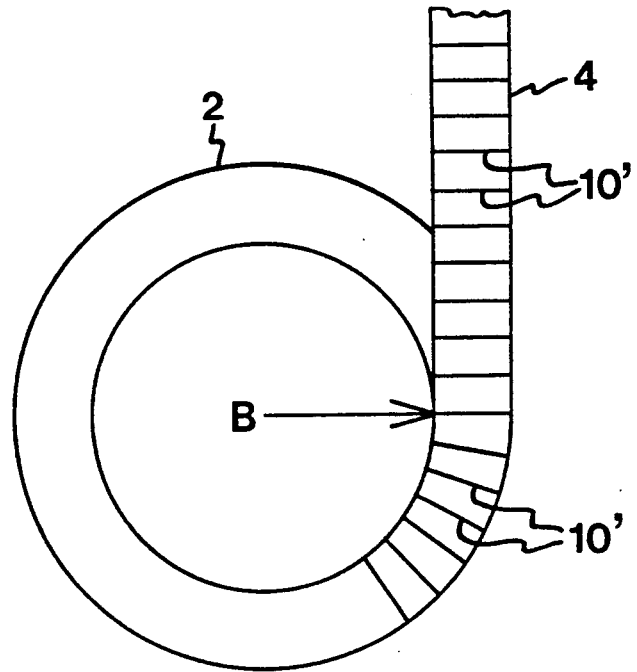

FIGS. 5 and 6 illustrate schematically the arrangement of the present invention and more precisely, the inventive manner of changing the pitch of the conveyor belt. In FIGS. 5 and 6, each pair of the rods 10 (shown in FIGS. 2 to 4) fixedly connected to the same links 11, 12, is shown by a line 10'.

In FIG. 5, a part of the lowermost tier in the helical path section 2 and of the preceding straight path section 3 is shown. The pitch of the conveyor belt 1 is illustrated by the schematically shown rods 10. As seen in FIG. 5, the belt 1 is collapsed along at least a part of the straight part section 3 closest to the helical path section 2. Thus, the pitch is at a minimum along both lateral edges of the belt on the upstream side of the helical path section up to a point A of transition between said straight path section 3 and said helical path section 2. At this point A, the links along the outer lateral edge of the belt 1 are expanded while the links along the inner lateral edge of the belt 1 are held collapsed. Thus, the pitch along the inner lateral edge of the belt 1 is retained at a minimum in the helical path section 2 while the pitch along the outer lateral edge of the belt is increased, preferably to a maximum as determined by the long holes 13, for example in the links 11 (FIG. 4).

In FIG. 6, a part of the uppermost tier in the helical path section 2 and of the following straight path section 4 is shown. As seen in FIG. 6, the belt 1 is expanded along the straight path section 4. Thus, the pitch is at the maximum along both lateral edges of the belt on the downstream side of the helical path section 2 from a point B of transition between said helical path section 2 and said straight path section 4. At this point B, the links along the inner lateral edge of the belt 1 are expanded while the links along the outer lateral edge of the belt 1 are held expanded.

Summarizing, the belt 1 is doubly expanded over that part of its path where it carries the food products, but is not collapsed over said part. When the products first contact the belt 1, both lateral edges thereof are collapsed. Further, on the downstream side of the helical path section 2 as well as through the return path section 5, the belt is expanded along both lateral edges and thereby achieves equal tension on the links 11, 12 at both lateral edges of the belt.

Several different forms of infeed devices for collapsing the belt 1 and keeping it collapsed through a predetermined part of the straight path section 3 are conceivable. Four different embodiments of such an infeed device will be described in the following referring to FIGS. 7-10.

Figure 7:
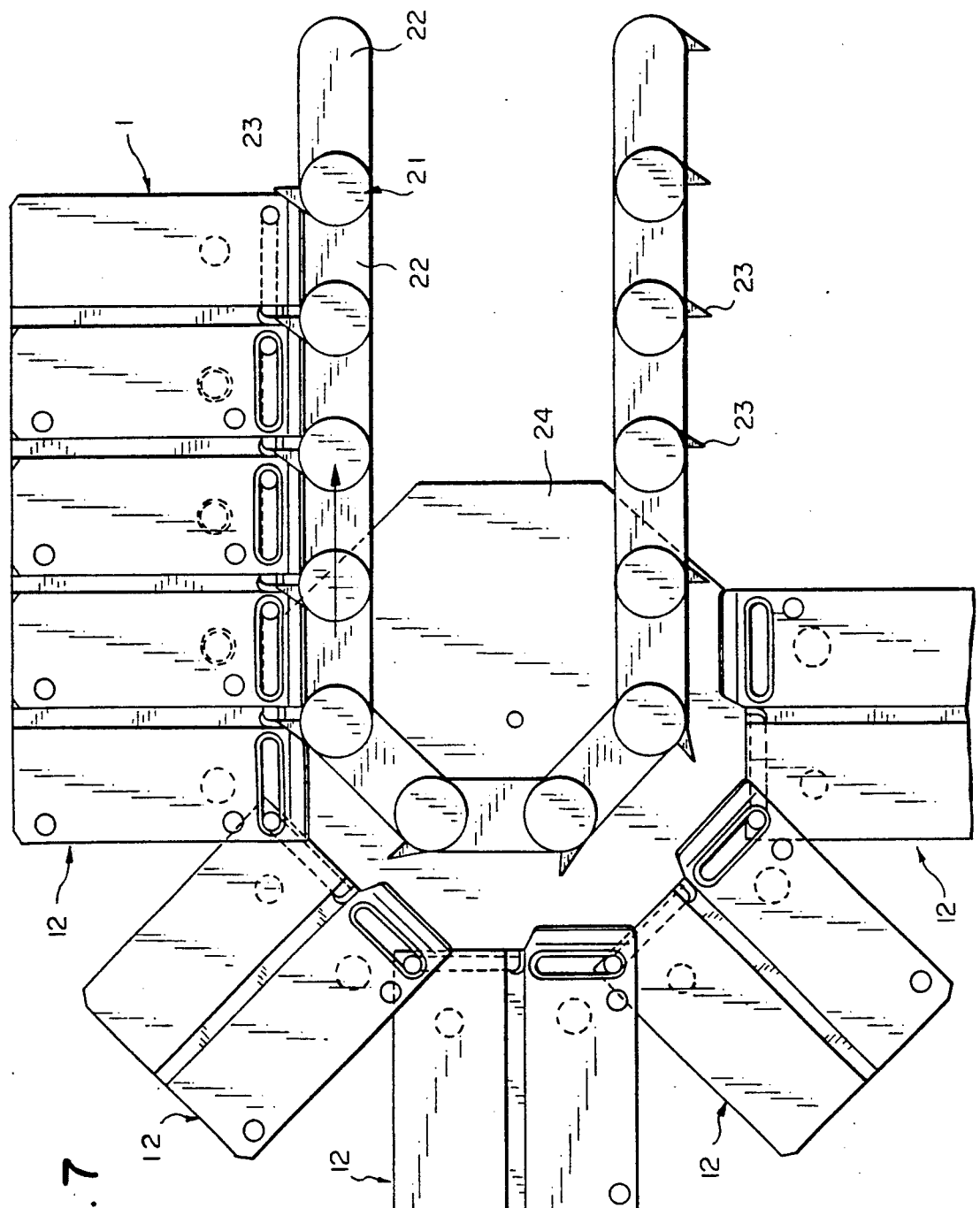
FIG. 7 is an elevational view of a first embodiment of a collapsing means according the present invention.

A first embodiment of an infeed device is shown in FIG. 7 and comprises a drive chain 21 having links 22. Each link has an upstanding hook 23 fixedly connected therewith for engaging a link 12 when collapsed. The belt 1 and the chain 21 are driven around a roller 24 at different peripheral speeds such that the links 12 are collapsed at the top side of the roller 24 where the hook 23 of a chain link 22 engages the collapsed belt link 12. A second chain might be arranged for engaging the links 11 at the opposite lateral edge of the belt 1. Thus, the belt 1 is in a collapsed state from the roller 24 up to the point A of transition between the straight path section 3 and the helical path section 2.

Figure 8:
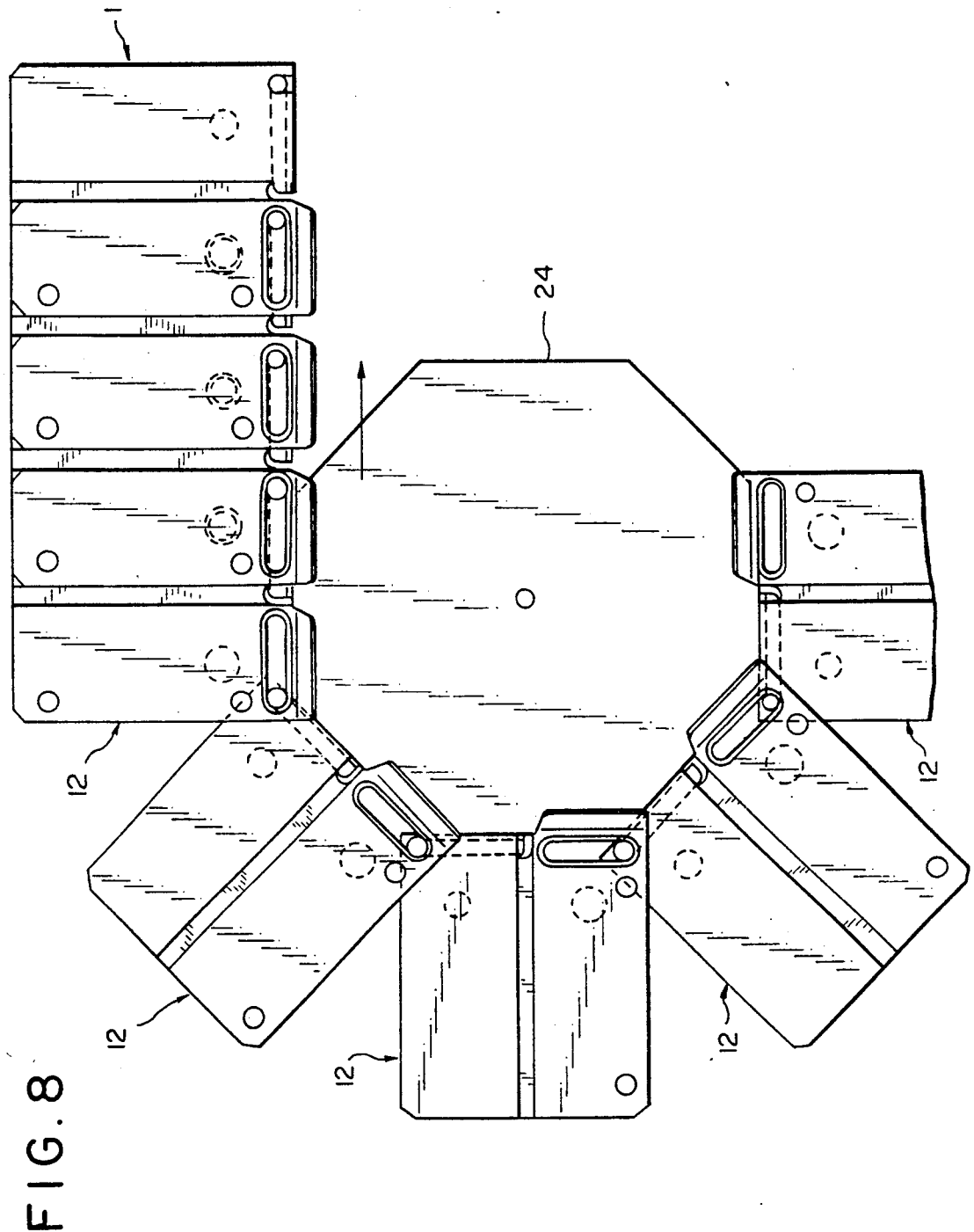
FIG. 8 is an elevational view of a second embodiment of a collapsing means according to the present invention.

In FIG. 8, a second embodiment of the infeed device is illustrated. This infeed device is identical with the infeed device shown in FIG. 7, except that no chain 21 is used. It should be noted that the speed of the belt along the straight path section 3 is lower than the speed of the belt 1 along the return path section 5, the difference in speed resulting in the desired collapsing of the belt 1 at the start of the straight path section 3.

In FIGS. 9A and 9B, a third embodiment of the infeed device is illustrated. In this embodiment, each link 12 has a lever 25 rotatably connected to an outer end of a rod 10 fixedly connected to said link 12. The lever 25 is a triangular plate having an opening with a curved surface 26 opposite to the rod 10. The curved surface 26 co-operates with the end of a rod 10 of an adjoining link 12. A cam surface 27 extends along the straight path section 3 having an ascending ramp portion 28 at the start of said straight path section 3 and a descending ramp portion 29 at the end of said straight path section 3, i.e. at the point A of transition between said straight path section 3 and the helical path section 2. When reaching the ramp portion 28, the lever 25 is rotated in clockwise direction and locks adjoining links 12 in the collapsed state. As in the embodiments shown in FIGS. 7 and 8, the belt 1 is collapsed by the action of the roller 24. At the end of the straight path section 3, the lever 25 is rotated in anticlockwise direction so as to unlock adjoining links 12, thereby permitting the expansion of the links 12 at the start of the helical path section 2.

In FIG. 10, a fourth embodiment of the infeed device is illustrated. Also in this embodiment, the roller 24 is used to collapse the belt 1 at the start of the straight path section 2. The links 12 are held in a collapsed state through the straight path section 3 by compression springs 30 interconnecting adjoining links 12. The compression force of the springs 30 is such as to keep the links 12 collapsed through the straight path section 3 and to permit the links 12 to expand at the point A of transition between the straight path section 3 and the helical path section 2.

It will be seen that the objects hereinbefore set forth may be attained. Since various modifications may be made in the above embodiments of the invention without departing from the scope thereof, it is intended that the above description and the accompanying drawings shall be interpreted as illustrative and not in a limiting sense.

What is claimed is:

1. In a plant for treatment of food products, a belt conveyor system comprising
    an endless conveyor belt following, through part of its length, a helical path section preceded by a first straight path section, and followed by a second straight path section,
    said belt comprising transverse elements interconnected by links disposed along opposite lateral edges of the belt,
    the successive links at each lateral edge of the belt being mutually slideable in the longitudinal direction of the belt and mutually pivotable about a transverse axis substantially in the plane of the belt, such that the belt is permitted to follow lateral curves in both directions and to pass around a roller having an axis parallel to said transverse axis;
    and further comprising means for collapsing the belt along a predetermined part of said first straight path section closest to said helical path section, the links at a point of a transition from said first straight path section to said helical path section being expanded along the outer lateral edge of the belt and being held collapsed along the inner lateral edge of the belt, and
    traction means for applying a tractive force on the links at both lateral edges of the belt in said second straight path section, the links at the point of transition from said helical path section to said second straight path section being expanded along the inner lateral edge of the belt and being held expanded along the outer lateral edge of the belt.

2. A belt conveyor as claimed in claim 1, wherein the belt is self-supporting at least at one of the opposite lateral edges thereof.

3. A belt conveyor system as claimed in claim 1, wherein said means for collapsing the belt along said predetermined part of said straight path section comprises a drive roller engaging the links at the upstream end of said predetermined part of said straight path section.

4. A belt conveyor system as claimed in claim 1, wherein the belt is collapsed along said predetermined part of said straight path section by means of chains engaging the links at both lateral edges of the belt.

5. A belt conveyor system as claimed in claim 1, wherein the belt is collapsed along said predetermined part of said straight path section by means of cam controlled levers pivotably attached to each link.

6. A belt conveyor system as claimed in claim 1, wherein the belt is collapsed along said predetermined part of said straight path section by means of springs interconnecting successive links at both lateral edges of the belt.

7. In a plant for treatment of food products, a belt conveyor system comprising
   an endless conveyor belt following, through part of its length, a helical path section preceded by a straight path section,
   said belt comprising transverse elements interconnected by links disposed along opposite lateral edges of the belt,
   the successive links at each lateral edge of the belt being mutually slideable in the longitudinal direction of the belt and mutually pivotable about a transverse axis substantially in the plane of the belt, such that the belt is permitted to flow lateral curves in both directions and to pass around a roller having an axis parallel to said transverse axis;
   and further comprising means for collapsing the belt along a predetermined part of said straight path section closest to said helical path section,
   whereby the links at a point of a transition from said straight path section to said helical path section are expanded along the outer lateral edge of the belt and are held collapsed along the inner lateral edge of the belt; and
   wherein said means for collapsing the belt along said predetermined part of said straight path section comprises a drive roller engaging the links at the upstream end of said predetermined part of said straight path section.

8. In a plant for treatment of food products, a belt conveyor system comprising
   an endless conveyor belt following, through part of its length, a helical path section preceded by a straight path section,
   said belt comprising transverse elements interconnected by links disposed along opposite lateral edges of the belt,
   the successive links at each lateral edge of the belt being mutually slidable in the longitudinal direction of the belt and mutually pivotable about a transverse axis substantially in the plane of the belt, such that the belt is permitted to follow lateral curves in both directions and to pass around a roller having an axis parallel to said transverse axis;
   and further comprising means for collapsing the belt along a predetermined part of said straight path section closest to said helical path section,
   whereby the links at a point of a transition from said straight path section to said helical path section are expanded along the outer lateral edge of the belt and are held collapsed along the inner lateral edge of the belt; and
   wherein the belt is collapsed along said predetermined part of said straight path section by means of chains engaging the links at both lateral edges of the belt.

9. In a plant for treatment of food products, a belt conveyor system comprising
   an endless conveyor belt following, through part of its length, a helical path section preceded by a straight path section,
   said belt comprising transverse elements interconnected by links disposed along opposite lateral edges of the belt,
   the successive links at each lateral edge of the belt being mutually slideable in the longitudinal direction of the belt and mutually pivotable about a transverse axis substantially in the plane of the belt, such that the belt is permitted to follow lateral curves in both directions and to pass around a roller having an axis parallel to said transverse axis;
   and further comprising means for collapsing the belt along a predetermined part of said straight path section closest to said helical path section,
   whereby the links at a point of a transition from said straight path section to said helical path section are expanded along the outer lateral edge of the belt and are held collapsed along the inner lateral edge of the belt; and
   wherein the belt is collapsed along said predetermined part of said straight path section by means of springs interconnecting successive links at both lateral edges of the belt.

* * * * *